C. SPICKERMAN.
DOOR MAT.
APPLICATION FILED FEB. 1, 1912.
1,062,195.
Patented May 20, 1913.
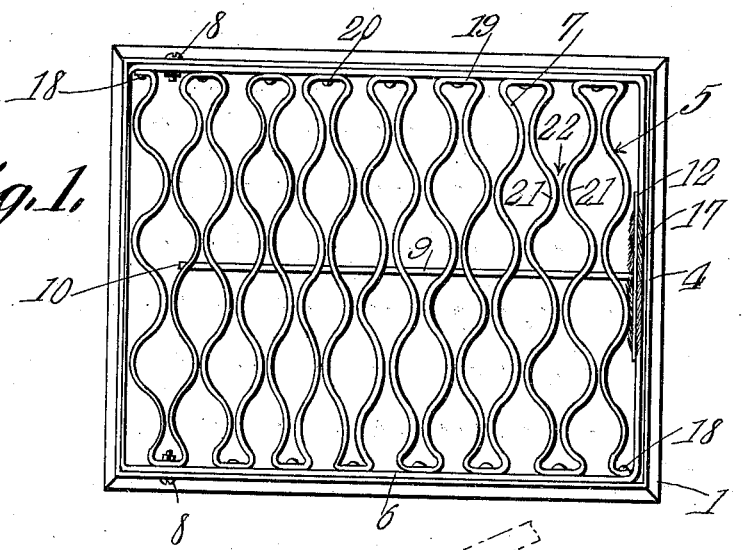
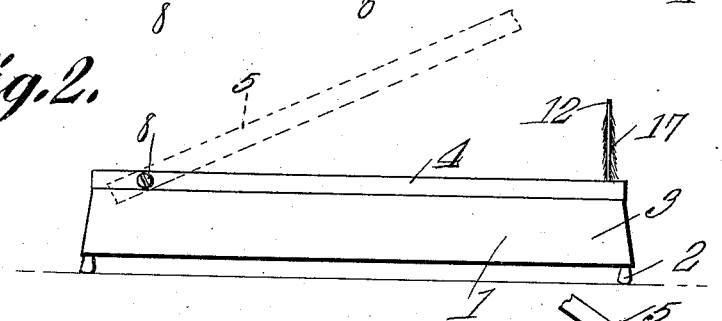
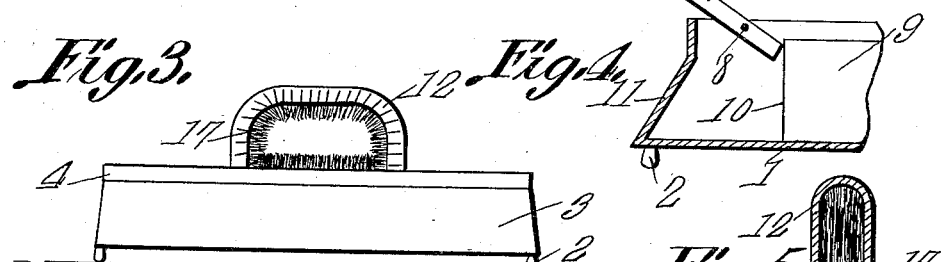
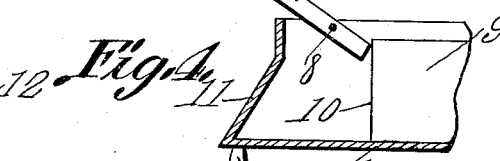
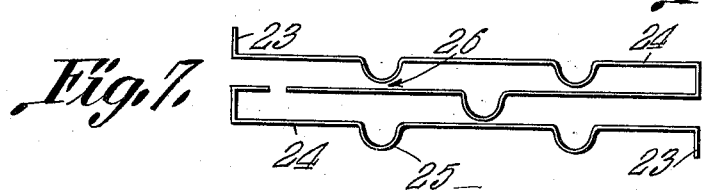
Witnesses
C. Spickerman, Inventor
by
Attorneys
COLUMBIA PLANOGRAPH CO., WASHINGTON, D. C.

UNITED STATES PATENT OFFICE.

CHRISTIAN SPICKERMAN, OF SANDWICH, ILLINOIS.

DOOR-MAT.

1,062,195. Specification of Letters Patent. Patented May 20, 1913.

Application filed February 1, 1912. Serial No. 674,781.

*To all whom it may concern:*

Be it known that I, CHRISTIAN SPICKERMAN, a citizen of the United States, residing at Sandwich, in the county of Dekalb and State of Illinois, have invented a new and useful Door-Mat, of which the following is a specification.

The present invention aims to provide a foot mat having a pan and a pivoted scraper, the construction being such that the pan is adapted to receive all of the material from the scraper, the scraper being adapted to be swung into an open position with respect to the pan, thereby to facilitate the cleaning of the pan.

The invention aims generally to enhance the utility of devices of the type herein disclosed, and, specifically, to provide novel means for limiting the swinging movement of the scraper.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in top plan, the scraper being in closed position with respect to the pan; Fig. 2 is a side elevation showing in dotted lines, the scraper in partially open position; Fig. 3 is an end view of the device; Fig. 4 is a fragmental longitudinal section showing the manner in which certain elements of the structure coöperate, when the scraper is swung into an open position with respect to the pan; Fig. 5 is a transverse section of the arched element which is secured to one end of the scraper, for the double purpose of facilitating the swinging of the scraper into an open position and for cleaning the upper of the shoe; and Fig. 6 is a fragmental longitudinal section of the structure shown in Fig. 5; and Fig. 7 is a fragmental plan showing a modified form of attrition member.

In carrying out the invention there is provided as a primary element, a pan 1, which may be of any desired form. In the present instance, the pan 1 is supported by resilient knobs 2, and comprises a frusto-pyramidal body 3, provided at its upper edge with a vertical flange 4. The bottom of the pan 1 is imperforate.

The invention further includes a scraper 5, having a frame 6, fitting closely within the periphery of the vertical flange 4 of the pan 1. Located within the frame 6, and filling the frame, is an open member 7. The scraper 5 is pivotally mounted, intermediate its ends, in the pan 1, by means of bolts or the like, denoted generally by the numeral 8, the bolts 8 passing through the vertical flange 4 of the pan 1, and through the frame 6, intermediate the ends of the frame, and closer to one end of the frame than to the other end thereof.

In order to maintain the scraper 5 in a horizontal position within the pan 1, so as to constitute a closure for the pan, a support 9, preferably taking the form of a partition, projects from one end of the pan 1, toward the other end thereof. When the scraper 5 is in the position shown in Fig. 1, the lower face of the scraper 5 will rest upon the upper edge of the support 9. Referring particularly to Fig. 4, it will be seen that one end 10 of the support 9 is spaced from one end 11 of the pan 1, the pivotal mounting 8 of the scraper 5 being located between the ends 10 and 11 of the support 9 and of the pan 1, respectively. The construction is such that when the scraper 5 is swung into an open position, as shown in Fig. 4, one end of the scraper will engage with the end wall 10 of the support 9, as clearly shown in Fig. 4, the rearward tilting movement of the scraper 5 with respect to the pan 1 being thereby limited.

That end of the frame 6 of the scraper 5 which is most remote from the pivotal mounting 8 of the scraper, is provided with an upstanding handle 12, located at right angles to the plane of the scraper 5, the handle 12 being of arched construction. In cross section, the handle 12 is of trough shape, both of the side walls of the handle 12 being corrugated, as shown at 15, to define a series of pockets 16 in which are held bristles 17, or a polishing member of any other desired sort, the polishing member projecting from the intrados of the arched handle 12, toward the upper face of the scraper 5.

The handle 12 exercises three functions. In the first place, when the shoe of the operator is slid along the scraper 5, the toe of the shoe may be passed through the member 12, whereby the bristles 17 will serve to clean the upper of the shoe, at the same time that the sole of the shoe is cleaned by the scraper 5. Secondly, the member 12, owing to its arched form, serves to reinforce the end of the scraper 5. Thirdly, as will be evident, the member 12 constitutes a handle, whereby the scraper may be swung upon its pivotal mounting 8, into the open position shown in Fig. 4.

The polishing member 17 which is carried by the arched element 12 serves, as will be understood readily, to clean and to polish the upper of the shoe.

The attrition member 7, hereinbefore referred to, may be variously fashioned. As shown in Fig. 1, a single strip of resilient material is secured at its ends, as shown at 18, to the sides of the frame 6, adjacent diagonally disposed corners of the frame. The strip of resilient material is bent to form a series of loops extended transversely of the frame 6. The ends of the loops are flattened, as shown at 19, so as to fit against the frame, these flattened ends 19 being attached to the frame by means of securing elements 20, of any desired form. The loops are corrugated, as shown at 21. The corrugations of one loop extend toward the corrugations of the next adjoining loop. The corrugations 21 of adjoining loops are spaced slightly apart, as shown at 22.

If desired, the member 7 may be modified to the extent indicated in Fig. 7. Under such circumstances, a single resilient strip is employed, as before, the ends 23 of the strip being secured to the frame 6, as hereinbefore set forth. The strip is fashioned into a plurality of loops 24, portions of the loops 24 being corrugated, as shown at 25. Each corrugation 25 is spaced slightly, as shown at 26, from the straight portion of the next adjoining loop.

Having thus described the invention, what is claimed is:—

1. In a device of the class described, a pan; a scraper pivoted intermediate its ends in the pan; and a support upstanding from the bottom of the pan, the upper edge of the support being adapted to engage the lower face of the scraper, to hold the scraper in position to serve as a closure for the pan, one end of the support being spaced from one end of the pan, said end of the support being engageable by one end of the scraper, to limit the rearward swinging movement of the scraper, when the scraper is swung into open position with respect to the pan.

2. In a device of the class described, a pan; a partition extended longitudinally of the pan, and terminating short of one end of the pan; and a scraper pivoted in the pan, adjacent said end of the pan, the scraper being adapted to rest upon the upper edge of the partition, when the scraper is in closed relation with respect to the pan, one end of the scraper being engageable by one end of the partition, when the scraper is swung into an open position with respect to the pan.

In testimony that I claim the foregoing as my own, I have hereto affixed my signature in the presence of two witnesses.

CHRISTIAN SPICKERMAN.

Witnesses:
F. S. MOSHER,
F. W. SLY.